(12) United States Patent
Kang (10) Patent No.: US 10,682,609 B2
(45) Date of Patent: Jun. 16, 2020

(54) RECOVERY METHOD FOR AMMONIUM BICARBONATE SOLUTION (71) Applicant: BENIT M CO., LTD., Nam-gu, Ulsan (KR)

(72) Inventor: Ki-Joon Kang, Gyeonggi-do (KR)

(73) Assignee: BENIT M CO, LTD, Nam-Gu Ulsan (KR)

( * ) Notice: Subject to any disclaimer, the term of this patent is extended or adjusted under 35 U.S.C. 154(b) by 0 days.

(21) Appl. No.: 16/088,663

(22) PCT Filed: Nov. 4, 2016

(86) PCT No.: PCT/KR2016/012696
§ 371 (c)(1),
(2) Date: Sep. 26, 2018

(87) PCT Pub. No.: WO2017/217611
PCT Pub. Date: Dec. 21, 2017

(65) Prior Publication Data
US 2019/0111390 A1 Apr. 18, 2019

(30) Foreign Application Priority Data
Jun. 15, 2016 (KR) .................. 10-2016-0074676

(51) Int. Cl.
*B01D 61/00* (2006.01)
*B01D 3/10* (2006.01)
(Continued)

(52) U.S. Cl.
CPC ............. *B01D 61/005* (2013.01); *B01D 3/00* (2013.01); *B01D 3/10* (2013.01); *B01D 5/006* (2013.01);
(Continued)

(58) Field of Classification Search
CPC ........ B01D 5/006; B01D 5/009; B01D 53/14; B01D 53/1475; B01D 53/58; B01D 53/62;
(Continued)

(56) References Cited

U.S. PATENT DOCUMENTS

2009/0308727 A1 12/2009 Kirts
2010/0267123 A1 10/2010 Wibberley
(Continued)

FOREIGN PATENT DOCUMENTS

| KR | 101184787 | 9/2012 |
| KR | 101255725 | 4/2013 |

(Continued)

OTHER PUBLICATIONS

ISR for International Application No. PCT/KR2016/012696 dated Mar. 14, 2017.
(Continued)

*Primary Examiner* — Brian A McCaig
(74) *Attorney, Agent, or Firm* — Perman & Green, LLP (57) ABSTRACT

A method of regenerating an ammonium bicarbonate solution includes supplying a diluted ammonium bicarbonate solution to an upper portion of a distillation unit, an upper portion of an ammonia condenser, and an upper portion of an absorber; distilling the diluted solution to discharge a first gas mixture, supplying the first gas mixture to a lower portion of the ammonium condenser; bringing the first gas mixture into contact with the diluted solution to be separated into a first mixed solution and a second gas mixture, supplying the first mixed solution to the upper portion of the absorber, and supplying the second gas mixture to a lower portion of the absorber; and bringing the second gas mixture into contact with the diluted solution supplied to the upper portion of the absorber and the first mixed solution supplied
(Continued)

to the upper portion of the absorber to recover a concentrated ammonium bicarbonate solution.

12 Claims, 4 Drawing Sheets

(51) Int. Cl.
| | | |
|---|---|---|
| *B01D 53/58* | (2006.01) | |
| *B01D 47/00* | (2006.01) | |
| *B01D 3/00* | (2006.01) | |
| *B01D 53/78* | (2006.01) | |
| *C02F 1/04* | (2006.01) | |
| *B01D 53/14* | (2006.01) | |
| *C02F 1/44* | (2006.01) | |
| *B01D 53/62* | (2006.01) | |
| *B01D 5/00* | (2006.01) | |
| *C02F 103/08* | (2006.01) | |

(52) U.S. Cl.
CPC .............. *B01D 5/009* (2013.01); *B01D 47/00* (2013.01); *B01D 53/14* (2013.01); *B01D 53/1475* (2013.01); *B01D 53/58* (2013.01); *B01D 53/62* (2013.01); *B01D 53/78* (2013.01); *B01D 61/00* (2013.01); *C02F 1/04* (2013.01); *C02F 1/44* (2013.01); *C02F 1/445* (2013.01); *B01D 2252/103* (2013.01); *B01D 2257/406* (2013.01); *B01D 2257/504* (2013.01); *C02F 2103/08* (2013.01); *C02F 2303/16* (2013.01); *Y02P 70/34* (2015.11)

(58) Field of Classification Search
CPC ...... B01D 53/78; B01D 61/00; B01D 61/005; B01D 3/00; B01D 3/10; B01D 47/00; C02F 1/04; C02F 1/44; C02F 1/445
See application file for complete search history.

(56) References Cited

U.S. PATENT DOCUMENTS

| | | |
|---|---|---|
| 2013/0112603 A1 | 5/2013 | Koo et al. |
| 2015/0343368 A1 | 12/2015 | Koo et al. |
| 2016/0051932 A1 | 2/2016 | Kang et al. |

FOREIGN PATENT DOCUMENTS

| | | |
|---|---|---|
| KR | 1020150000822 | 1/2015 |
| WO | 2013157776 | 10/2013 |

OTHER PUBLICATIONS

Tae-Woo Kim, et al; "Cost-effective design of a draw solution recovery process for forward osmosis desalination"; Desalination, Elsevier, Amsterdam, NL; vol. 327; Sep. 4, 2013; pp. 46-51.
European Search Report of European Patent Application 16905595.1 dated Oct. 30, 2019.

RECOVERY METHOD FOR AMMONIUM BICARBONATE SOLUTION

CROSS-REFERENCE TO RELATED APPLICATION

This application is the National Stage of International Application No. PCT/KR2016/012696, having an International Filing Date of Nov. 4, 2016, which designated the United States of America, and which International Application was published under PCT Article 21 (2) as WO Publication No. 2017/217611A1, and which claims priority from and the benefit of Korean Application No. 10-2016-0074676, filed on Jun. 15, 2016, the disclosures of which are incorporated herein by reference in their entireties.

BACKGROUND

1. Field

The present disclosure relates to a method of regenerating an ammonium bicarbonate solution, and more particularly, to a method of regenerating an ammonium bicarbonate solution by using an ammonia condenser configured to separate a gas mixture discharged from a distillation unit into a liquid phase and a gaseous phase.

2. Description of the Related Art

As a method of recovering water in accordance with guidelines for domestic water or industrial water from seawater, waste water, or contaminated water which is not suitable for direct use as domestic water or industrial water by removing salt and other impurities, a membrane separation method including a reverse osmosis method and a forward osmosis method and an evaporation method are most widely used. The evaporation method, which requires heating, and the reverse osmosis method, which requires pressurization, are disadvantageous in that energy consumption is high when recovering water, whereas the forward osmosis method has lower energy consumption than the evaporation method or the reverse osmosis method.

The forward osmosis method is a method of separating water from seawater using osmotic pressure and requires a draw solution on the opposite side of seawater with respect to a membrane. An ammonium bicarbonate solution, which is environmentally friendly, may be used as the draw solution.

In a case in which a forward osmosis method is performed using ammonium bicarbonate as a draw solution, water transferred to an ammonium bicarbonate solution by forward osmotic pressure is separated and if the ammonium bicarbonate solution is not regenerated, the draw solution has to be produced by continuously supplying ammonium carbonate. Thus, when this method is used, it is necessary to regenerate the ammonium bicarbonate solution.

A separation tower may be used as a method of regenerating an ammonium bicarbonate solution. In an existing separation tower, carbon dioxide and ammonia are evaporated by a heat source located at a lower portion of the separation tower and discharged upward of the separation tower, and a condenser is needed to collect the carbon dioxide and the ammonia discharged upward of the separation tower. However, in the condenser, a salt is produced by a reaction between the carbon dioxide and the ammonia, and thus to prevent solidification of the salt, it is necessary to raise a temperature or wash the salt with a large amount of water. In addition, in a case in which water is separated from an ammoniumbicarbonate solution diluted in the process, if a temperature of a mixed gas of ammonia and carbon dioxide, including vapor is reduced to a certain temperature or less, the ammonia and the carbon dioxide react to thereby produce ammonium bicarbonate, and a solubility thereof is reduced, thus producing a solid salt, which causes clogging of a pipe. That is, the produced gas is a draw solute component for fresh water, and thus should be recovered into a solution, and in this process, it is necessary to perform a condensation process at a reduced temperature. Thus, in construction of a large-capacity fresh water system, it is more difficult to remove a solid salt or maintain the temperature of a pipe, and therefore, the generation of a solid salt has emerged as a serious issue.

As the related art, U.S. Patent Application Publication No. 2009-0308727 discloses a method of recovering carbon dioxide and ammonia by using a compressor. In this invention, a considerable amount of ammonium carbonate is produced, and thus continuous operation is impossible, and for continuous operation, the resulting product should be diluted with a large amount of water, and thus a large amount of the produced water is consumed, and a large amount of electricity is consumed to operate a compressor.

U.S. Patent Application Publication No. 2013-0112603 discloses a method of recovering carbon dioxide and ammonia by using a first membrane contactor configured to separate fresh water and a gas and a second membrane contactor configured to re-concentrate the separated gas. In this regard, in the second membrane contactor, carbon dioxide and ammonia which have different solubilities for water are simultaneously absorbed into water or a dilution draw solution, and thus there is a limitation in producing a highly-concentrated ammonium bicarbonate solution.

Currently, in the art to which the present disclosure pertains, studies have continuously conducted on efficient recovery of an ammonium bicarbonate solution used as a draw solution in a forward osmosis method.

SUMMARY

Provided is a method of regenerating an ammonium bicarbonate solution which is capable of continuously regenerating a highly-concentrated ammonium bicarbonate solution by preventing ammonium bicarbonate from being separated and absorbing carbon dioxide, which may be discharged as a gas, to a maximum extent, in a forward osmosis-type water treatment apparatus.

According to an aspect of the present disclosure, a method of regenerating an ammonium bicarbonate solution includes: (A) supplying an ammonium bicarbonate solution diluted by forward osmosis to an upper portion of a distillation unit, an upper portion of an ammonia condenser, and an upper portion of an absorber; (B) distilling the diluted ammonium bicarbonate solution supplied to the upper portion of the distillation unit to discharge a first gas mixture including carbon dioxide and ammonia, and supplying the discharged first gas mixture to a lower portion of the ammonium condenser; (C) bringing the first gas mixture supplied to the lower portion of the ammonium condenser in process (B) into contact with the diluted ammonium bicarbonate solution supplied to the upper portion of the ammonium condenser in process (A) to be separated into a first mixed solution and a second gas mixture, supplying the first mixed solution to the upper portion of the absorber, and supplying the second gas mixture to a lower portion of the absorber; and (D) bringing the second gas mixture supplied to the lower portion of the absorber in process (C) into contact with the diluted ammonium bicarbonate solution supplied to the upper portion of the absorber in process (A) and the first mixed solution supplied to the upper portion of the absorber in process (C) to recover a concentrated ammonium bicarbonate solution.

According to one aspect of the present disclosure, the first mixed solution contains a larger amount of ammonia than that of carbon dioxide and the second gas mixture includes a larger amount of carbon dioxide than that of ammonia, on a molar basis.

According to one aspect of the present disclosure, an amount of ammonia included in the first mixed solution may range from 100 wt % to 400 wt %, preferably 150 wt % to 350 wt %, and more preferably 200 wt % to 300 wt %, with respect to an amount of carbon dioxide included in the first mixed solution, and an amount of ammonia included in the second gas mixture ranges from 5 wt % to 35 wt %, preferably 10 wt % to 35 wt %, and more preferable 15 wt % to 35 wt %, with respect to an amount of ammonia included in the second gas mixture.

According to one aspect of the present disclosure, an upper temperature of the ammonia condenser ranges from 60° C. to 97° C., preferably 65° C. to 95° C., and more preferably 75° C. to 92° C.

According to one aspect of the present disclosure, the distillation unit operates at atmospheric pressure or under reduced pressure.

According to one aspect of the present disclosure, when the distillation unit operates at atmospheric pressure, the ammonia condenser includes a cooling device.

According to one aspect of the present disclosure, when the distillation unit operates under reduced pressure, the first gas mixture generated in the distillation unit is pressurized by atmospheric pressure to be supplied to the ammonia condenser.

According to one aspect of the present disclosure, when the distillation unit operates at atmospheric pressure, the distillation unit, the ammonia condenser, and the absorber are located in a single device.

According to one aspect of the present disclosure, when the distillation unit operates under reduced pressure, the distillation unit, the ammonia condenser, and the absorber are present in respective devices separated from one another, or the distillation unit is present in a device separated from the ammonia condenser and the absorber.

According to one aspect of the present disclosure, the method further includes (E) washing an exhaust gas with washing water, the exhaust gas not being recovered into the concentrated ammonium bicarbonate solution in the absorber, and discharging the exhaust gas.

According to one aspect of the present disclosure, an amount of the diluted ammonium bicarbonate solution supplied to the distillation unit ranges from 30 wt % to 75 wt %, preferably 45 wt % to 70 wt %, and more preferably 50 wt % to 65 wt %, with respect to a total amount of the diluted ammonium bicarbonate solution.

According to one aspect of the present disclosure, an amount of the diluted ammonium bicarbonate solution supplied to the ammonia condenser ranges from 2 wt % to 40 wt %, preferably 4 wt % to 30 wt %, and more preferably 5 wt % to 20 wt %, with respect to the total amount of the diluted ammonium bicarbonate solution.

As described above, a method of regenerating an ammonium bicarbonate solution, according to the present disclosure not only can minimize the amount of carbon dioxide discharged when regenerating an ammonium bicarbonate solution by arranging an ammonia condenser between a distillation unit and an absorber, but can also continuously regenerate a highly-concentrated ammonium bicarbonate solution by preventing separation of ammonium bicarbonate through the control of a supply amount of a diluted ammonium bicarbonate solution.

DETAILED DESCRIPTION

The present disclosure may be completely achieved by the following description with reference to the accompanying drawings. The following description should be understood by describing exemplary aspects of the present disclosure, and the present invention is not necessarily limited thereto.

The present disclosure relates to a method of regenerating an ammonium bicarbonate solution, which can be used as a draw solution, by separating water from an ammonium bicarbonate solution diluted by a forward osmosis unit. Table 1 below shows the solubility (g/100 g water) of an ammonium bicarbonate solution at 1 atm according to temperature, and the regeneration method according to the present disclosure is performed under a condition where ammonium bicarbonate is not separated as a salt.

TABLE 1

| | 30° C. | 40° C. | 50° C. | 60° C. | 70° C. | 80° C. |
|---|---|---|---|---|---|---|
| Ammonium bicarbonate (g) | 28.4 | 36.6 | 50 | 60 | 80 | 109 |

According to an aspect of the present disclosure, there is provided a method of regenerating an ammonium bicarbonate solution, the method including: supplying an ammonium bicarbonate solution diluted by forward osmosis to an upper portion of a distillation unit, an upper portion of an ammonia condenser, and an upper portion of an absorber; distilling the diluted ammonium bicarbonate solution supplied to the upper portion of the distillation unit to discharge a first gas mixture including carbon dioxide and ammonia, and supplying the discharged first gas mixture to a lower portion of the ammonium condenser; bringing the first gas mixture supplied to the lower portion of the ammonium condenser into contact with the diluted ammonium bicarbonate solution supplied to the upper portion of the ammonium condenser to be separated into a first mixed solution and a second gas mixture, supplying the first mixed solution to the upper portion of the absorber, and supplying the second gas mixture to a lower portion of the absorber; and bringing the second gas mixture supplied to the lower portion of the absorber into contact with the diluted ammonium bicarbonate solution supplied to the upper portion of the absorber and the first mixed solution supplied to the upper portion of the absorber to recover a concentrated ammonium bicarbonate solution. In the present specification, a solution with a reduced concentration due to introduction of water into an ammonium bicarbonate solution in a forward osmosis unit as needed is denoted as a diluted ammonium bicarbonate solution, and a solution with a relatively high concentration through the method of regenerating an ammoniumbicarbonate solution of the present disclosure is denoted as a concentrated ammonium bicarbonate solution. The concentrated ammonium bicarbonate solution has a concentration suitable for use as a draw solution in a forward osmosis unit.

Figure 1:
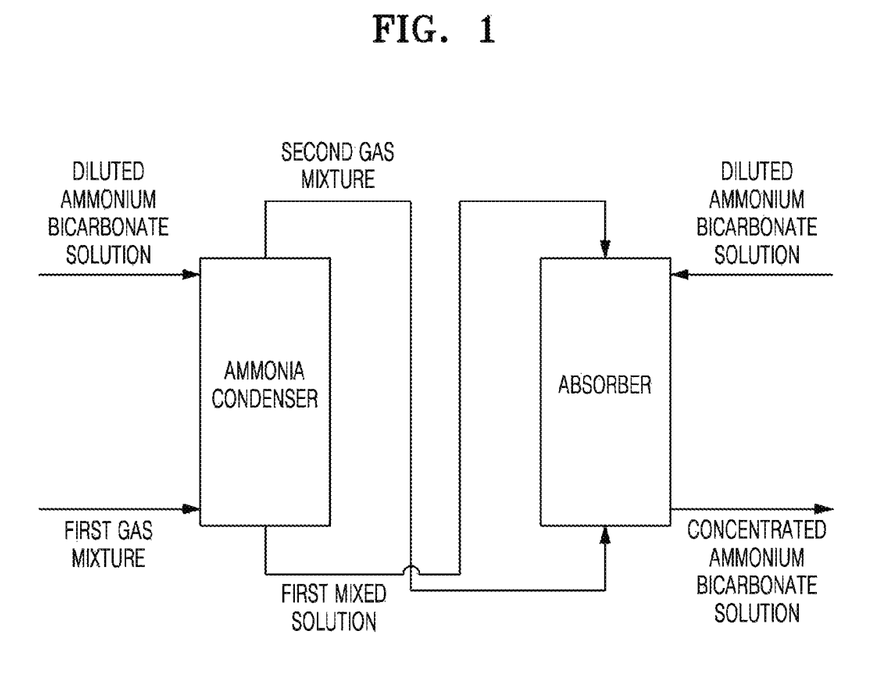
FIG. 1 is a schematic view for a method of recovering an ammonium bicarbonate solution using an ammonia condenser before being supplied to an absorber, according to an aspect of the present disclosure.

A flow of an ammonia condenser and an absorber of the method is illustrated in FIG. 1.

Forward Osmosis Unit

Forward osmosis unit is a portion configured to treat waste water, contaminated water, or seawater, and separates water from waste water, contaminated water, or seawater by forward osmosis and discharges treated water from which water is separated. The separated water exists in the form of a diluted osmotic solution in which water is substantially mixed with an osmotic solution (a draw solution), and the diluted osmotic solution is separated into water and a concentrated osmotic solution and then the concentrated osmotic solution is recycled to the forward osmosis unit. The present disclosure is a technique for regeneration of the diluted osmotic solution into the concentrated osmotic solution, and particularly, an ammonium bicarbonate solution is used as the osmotic solution, but the present disclosure is not limited to the above example.

Figure 2:
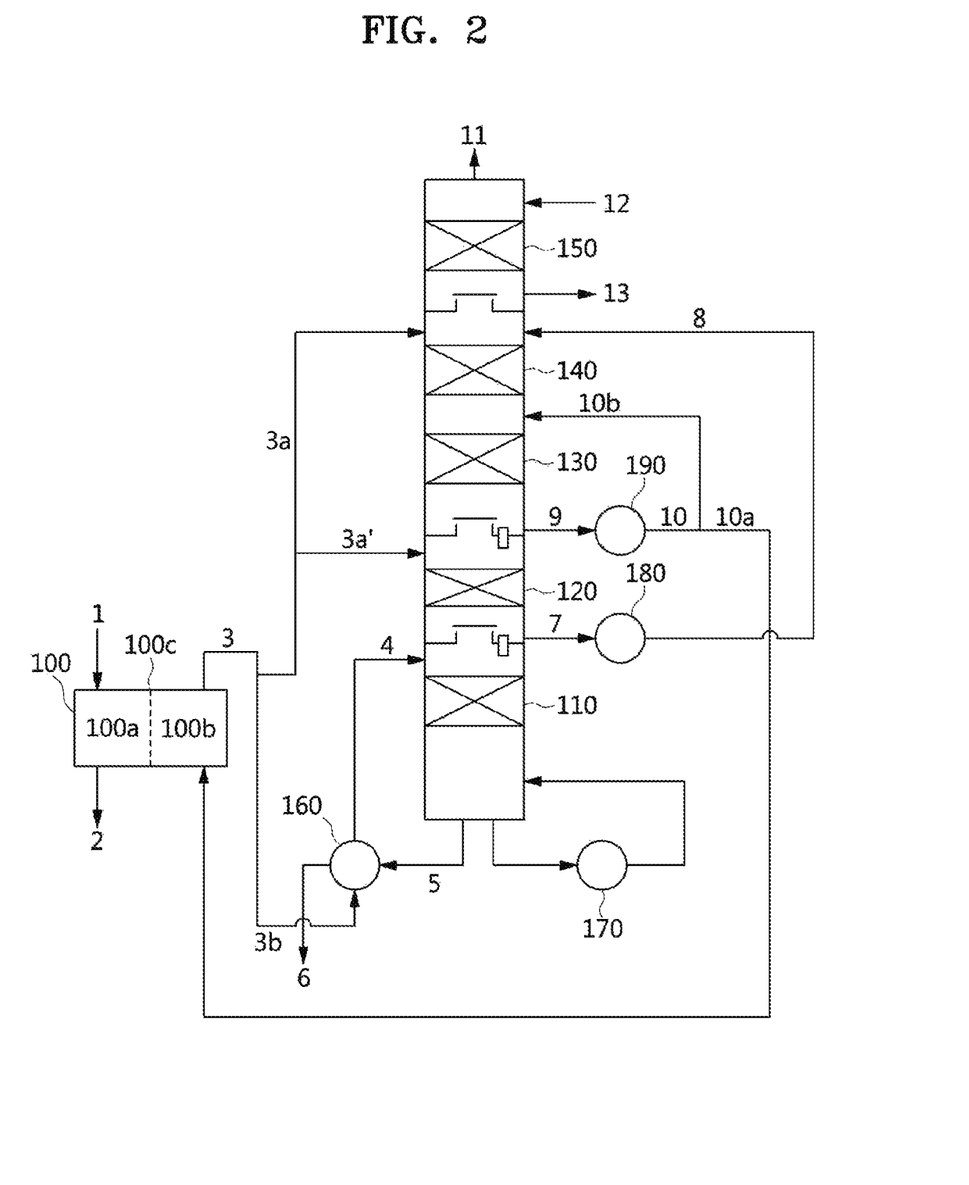
FIG. 2 is a process diagram illustrating a method of regenerating an ammonium bicarbonate solution in which a distillation unit operates at atmospheric pressure, according to an aspect of the present disclosure.
Figure 3:
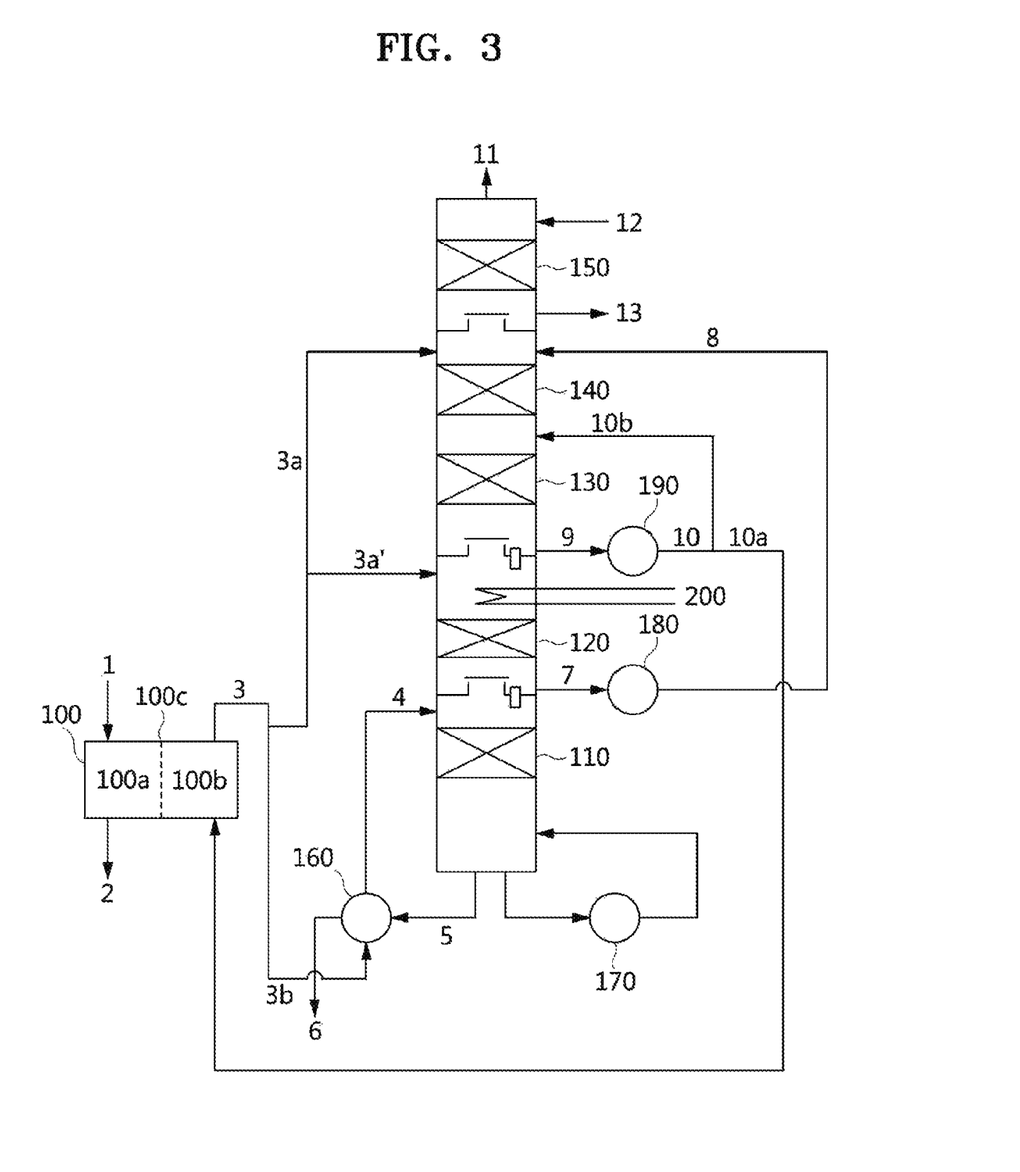
FIG. 3 is a process diagram illustrating a method of regenerating an ammonium bicarbonate solution in which a distillation unit operates at atmospheric pressure, and an ammonia condenser further includes a cooling device as compared to FIG. 2, according to an aspect of the present disclosure.
Figure 4:
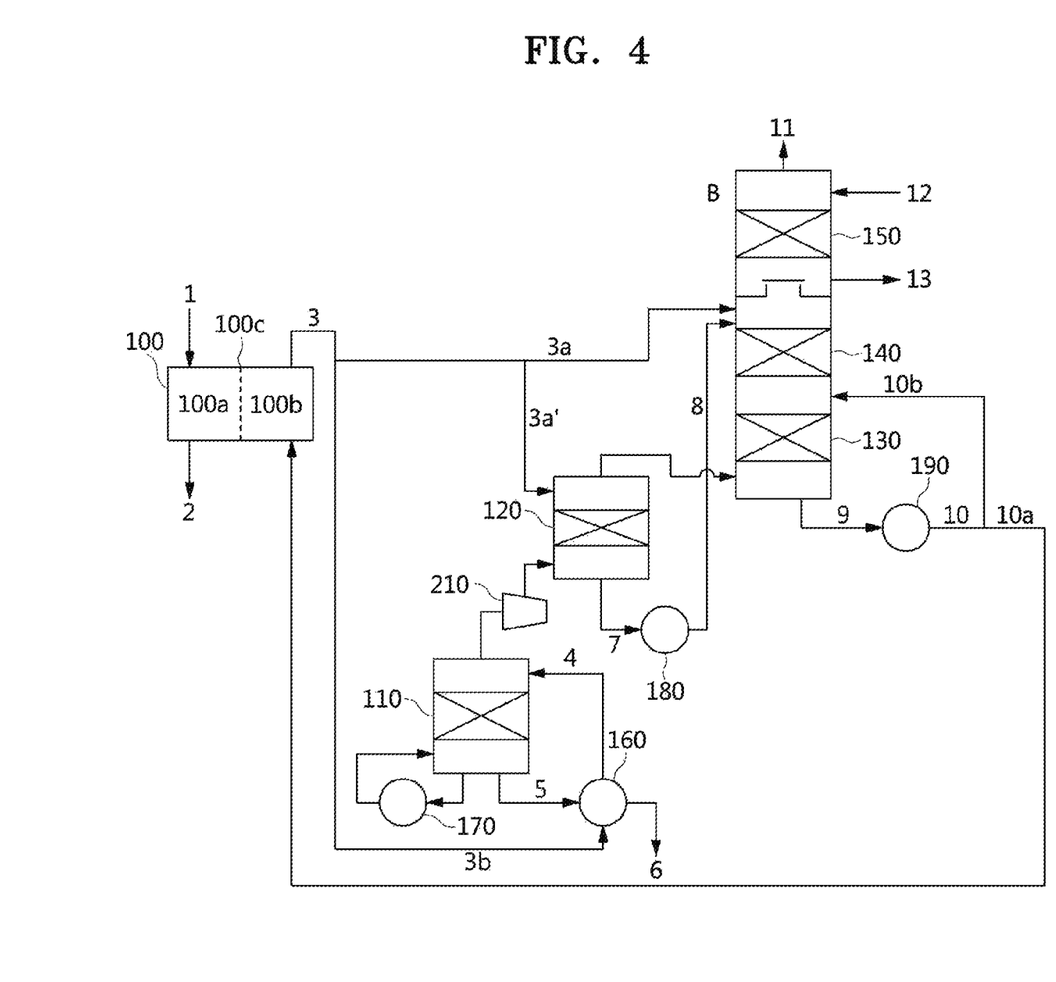
FIG. 4 is a process diagram illustrating a method of regenerating an ammonia bicarbonate solution in which a distillation unit operates under reduced pressure, according to an aspect of the present disclosure.

FIGS. 2 to 4 are process diagrams for regeneration of an ammonium bicarbonate solution using a forward osmosis unit 100, according to aspects of the present disclosure. As illustrated in FIGS. 2 to 4, the forward osmosis unit 100 includes a treated water zone 100a and an osmotic solution zone 100b with respect to an osmosis membrane 100c. Seawater is introduced into a treated water zone, and water is separated therefrom by forward osmotic pressure and then seawater is discharged from the treated water zone, and an ammonium bicarbonate solution as an osmotic solution is introduced into an osmotic solution zone, and water is absorbed therein by forward osmotic pressure and then the ammonium bicarbonate solution is discharged from the osmotic solution zone. According to one aspect of the present disclosure, the concentration of ammonium bicarbonate supplied to the osmotic solution zone 100b may range from 5 wt % to 20 wt %. The concentration of ammonium bicarbonate may vary according to a treatment target solution supplied to the treated water zone, but when the concentration of ammonium bicarbonate is less than 5 wt %, the amount of water moving to the osmotic solution zone through a semipermeable membrane is small, and thus, it is not efficient. When the concentration of ammonium bicarbonate is greater than 20 wt %, ammonium bicarbonate is separated according to treatment conditions or it is necessary to maintain a high temperature to increase solubility, and for high-temperature operation, pressure of the entire process has to be increased, and thus the transfer of water from the treated water zone to the osmotic solution zone is hindered in a forward osmotic unit. In addition, when operated at a high temperature, ammonium bicarbonate is easily evaporated and vanishes, and an osmosis membrane is easily damaged, and thus it is not suitable. The concentration of the ammonium bicarbonate solution diluted by the forward osmotic device may vary according to the concentration of treatment target solution and the concentration of osmotic solution, but according to one aspect of the present disclosure, may be adjusted to be 3 wt % to 15 wt %. When the concentration of the diluted ammonium bicarbonate solution is less than 3 wt %, the concentration of regenerated ammonium bicarbonate solution is low and thus an effect thereof as an osmotic solution in the forward osmosis unit is reduced and accordingly, an area of the osmosis membrane may be excessively increased. When the concentration of the diluted ammonium bicarbonate solution is greater than 15 wt %, ammonium bicarbonate is easily separated in the regeneration process, and the amount of a circulated osmotic solution may be excessive, resulting in an increase in electricity consumption. The temperature of the ammonium bicarbonate solution may be a temperature that does not allow ammonium bicarbonate to be separated with respect to the concentration of ammonium bicarbonate, and according to one aspect of the present disclosure, the temperature of the ammonium bicarbonate solution supplied to the osmotic solution zone may range from 20° C. to 30° C., and the temperature of the ammonium bicarbonate solution discharged from the osmotic solution zone may range from 5° C. to 30° C.

Distillation Unit

A part of a diluted ammonium bicarbonate solution discharged from the osmotic solution zone 100b of the forward osmosis unit 100 is supplied to a distillation unit 110, and the remainder is supplied to an ammonia condenser 120 and an absorber 140. The diluted ammonium bicarbonate solution having a lower concentration of ammonium bicarbonate than when supplied to the osmotic solution zone is supplied to a regeneration apparatus, and thus when the diluted ammonium bicarbonate solution is used as an absorption solvent of ammonia gas and carbon dioxide gas produced from the distillation unit 110, an ammonium bicarbonate solution suitable for use in the forward osmosis unit may be regenerated by concentration without supply of an absorption solvent from the outside, and existing dissolved ammonium bicarbonate may be used. The amount of a solution supplied to the distillation unit 110, the ammonia condenser 120, and the absorber 140 may be determined considering the amount of water absorbed in a forward osmosis unit, a target concentration of an osmotic solution, the amount of gas produced in the distillation unit 110, absorption efficiency of the absorber 140 according thereto, and the like, and according to one aspect of the present disclosure, the amount of a solution supplied to the distillation unit 110 may range from 30 wt % to 75 wt %, preferably 45 wt % to 70 wt %, and more preferably 50 wt % to 65 wt %, with respect to a total amount of the diluted ammonium bicarbonate solution discharged from a forward osmosis unit. When the amount of the solution is less than 30 wt %, the amount of an ammonium bicarbonate solution supplied to an osmosis unit has to be increased to produce the same amount of water, and thus the size of the device may be increased and electricity consumption may be increased. In addition, when the amount of the solution is greater than 75 wt %, the amount of the diluted ammonium bicarbonate solution to be supplied to the ammonia condenser 120 and the absorber 140 becomes relatively small, and thus greater amounts of carbon dioxide and ammonia may be lost.

The diluted ammonium bicarbonate solution supplied to the distillation unit 110 may be evaporated by energy supplied from a heater (a reboiler) 170 at atmospheric pressure or under reduced pressure. When the distillation unit 110 is operated at atmospheric pressure, it is disadvantageous in that the amount of energy supplied to evaporate the diluted ammonium bicarbonate solution supplied to the distillation unit 110 is large and the temperature of the energy supplied to a heater (a reboiler) has to be high, whereas it is advantageous in that the distillation unit 110 may be constructed in the same tower as that in which an ammonia condenser 120 and an absorber 140 that operate at atmospheric pressure are located, thus reducing construction costs. In addition, when the distillation unit 110 operates under reduced pressure, the distillation unit 110 should be constructed separately from the ammonia condenser 120 or the absorber 140 due to a pressure difference, but unlike the atmospheric pressure conditions, a smaller amount of thermal energy and a lower temperature of energy may be used, and thus it is advantageous in view of energy efficiency.

When the distillation unit 110 operates at atmospheric pressure, the distillation unit 110 is heated at an appropriate temperature so that water is recovered from the diluted ammonium bicarbonate solution via a lower portion of the distillation unit 110, and a first gas mixture including carbon dioxide and ammonia can be discharged via an upper portion of the distillation unit 110. According to one aspect of the present disclosure, the lower portion of the distillation unit 110 may be heated such that the temperature thereof reaches about 100° C., which is a boiling temperature of water. When the temperature is less than 100° C., carbon dioxide and ammonia are mixed with water and discharged to the lower portion of the distillation unit 110, and thus water cannot be used as it is. The temperature may be slightly higher than 100° C., which is due to pressure loss in a mass transfer section such as packing, tray, or the like installed in the tower. According to one aspect of the present disclosure, when the distillation unit 110 operates at atmospheric pressure, the distillation unit 110, the ammonia condenser 120, and the absorber 140 are installed in a single apparatus. Also, when the distillation unit 110 operates at atmospheric pressure, the ammonia condenser 120 comprises a cooling device 180, 190, 200.

In addition, when the distillation unit 110 operates under reduced pressure, the pressure of the distillation unit 110 is reduced to an appropriate pressure in consideration of thermal energy consumption and a degree of evaporation of the diluted ammonium bicarbonate solution. According to one aspect of the present disclosure, the distillation unit 110 operates at a pressure such that the pressure of an upper portion of the distillation unit 110 is reduced to 0.3 kgf/cm$^2$ to 0.5 kgf/cm$^2$ (absolute pressure). Due to the reduced pressure, a temperature of the lower portion of the distillation unit 110 is adjusted to be between 70° C. and 83° C. such that the first gas mixture including carbon dioxide and ammonia can be efficiently discharged via the upper portion of the distillation unit 110. According to one aspect of the present disclosure, when the distillation unit 110 operates under reduced pressure, the distillation unit 110, the ammonia condenser 120, and the absorber 140 are present in respective devices separated from one another. However, in actual process configuration, the ammonia condenser 120 and the absorber 140 may be constructed in a single apparatus to reduce equipment costs and prevent clogging of an upper pipe of the ammonia condenser 120.

Ammonia Condenser

The first gas mixture evaporated in the distillation unit 110 is supplied to a lower portion of the ammonia condenser 120. To produce an ammonium condensate by absorbing ammonia from the first gas mixture supplied to the lower portion of the ammonia condenser 120, the diluted ammonium bicarbonate solution is supplied to an upper portion of the ammonia condenser 120. Since the first gas mixture is separated into a liquid phase for supply to an upper portion of the absorber 140 and a gaseous phase for supply to a lower portion of the absorber 140, in the ammonia condenser 120, the ammonia condenser 120 may also be expressed as a vapor-liquid separator in the present specification. The diluted ammonium bicarbonate solution is supplied to the upper portion of the ammonia condenser 120 via a flow 3a' branched from a flow 3a of the diluted ammonium bicarbonate solution supplied to the absorber 140. According to one aspect of the present disclosure, the amount of the diluted ammonium bicarbonate solution supplied to the upper portion of the ammonia condenser 120 may range from 2 wt % to 40 wt %, preferably 4 wt % to 30 wt %, and more preferably 5 wt % to 20 wt %, with respect to a total amount of the diluted ammonium bicarbonate solution discharged from a forward osmosis unit. When the amount of the diluted ammonium bicarbonate solution is less than 2 wt %, it is impossible to sufficiently absorb ammonia gas from the first gas mixture including carbon dioxide and ammonia, and when the amount of the diluted ammonium bicarbonate solution is greater than 40 wt %, the amount of absorbed carbon dioxide gas is increased and thus an effect according to vapor-liquid separation is poor. In a case in which an ammonia condensate is produced only through supply of the diluted ammonium bicarbonate solution, a temperature of the upper portion of the ammonia condenser 120 may range from 60° C. to 97° C., preferably 65° C. to 95° C., and more preferably 75° C. to 92° C. When the temperature is too low, there is a possibility of condensation of a large amount of carbon dioxide, and a great amount of water present in a gaseous component is condensed, and thus a salt is generated by carbon dioxide and ammonia in a gaseous phase and a clogging phenomenon may occur, and when the temperature is too high, condensation of ammonia less occurs. Ammonia condensation through vapor-liquid separation may be further performed by cooling or compressing the first gas mixture supplied from the distillation unit 110 to the ammonia condenser 120, and in some cases, ammonia condensation through supply of the diluted ammonium bicarbonate solution may be omitted.

In the ammonia condenser 120, the first gas mixture is separated into a first mixed solution and a second gas mixture. On a molar basis, the first mixed solution includes a larger amount of dissolved ammonia than carbon dioxide, and the second gas mixture includes a greater amount of carbon dioxide than ammonia. According to one aspect of the present disclosure, the amount of ammonia dissolved in the first mixed solution may range from 100 wt % to 400 wt %, preferably 150 wt % to 350 wt %, and more preferably 200 wt % to 300 wt %, with respect to the amount of carbon dioxide, and the amount of ammonia included in the second gas mixture may range from 5 wt % to 35 wt %, preferably 10 wt % to 35 wt %, and more preferably 15 wt % to 35 wt %, with respect to the amount of carbon dioxide.

Absorber

The first mixed solution separated in the ammonia condenser 120 is supplied to an upper portion of the absorber 140, and the separated second gas mixture is supplied to a lower portion of the absorber 140. In addition, the diluted ammonium bicarbonate solution from the osmotic solution zone 100b of the forward osmosis unit 100 is supplied to an upper portion of the absorber 140. The diluted ammonium bicarbonate solution supplied to the upper portion of the absorber 140 is supplied in an amount obtained by subtracting the amount thereof supplied to the distillation unit 110 and the ammonia condenser 120 from a total amount thereof discharged from the osmotic solution zone 100b, and the amount of the diluted ammonium bicarbonate solution supplied to the distillation unit 110, the ammonia condenser 120, and the absorber 140 may be determined according to the above-described factors. The second gas mixture supplied to the absorber 140 contains a large amount of carbon dioxide, whereas the first mixed solution contains a large amount of ammonia and the solution containing a large amount of ammonia comes into contact with a gas moving upward from a lower portion of the absorber 140, and thus carbon dioxide may be more efficiently absorbed in the absorber 140. A point at which the first mixed solution is introduced into an absorption tower may be an upper portion of the absorber 140, and may not be necessarily a top end of the absorber 140 and may be located higher than a point at which the second gas mixture is introduced into the absorption tower.

The ammonium bicarbonate solution absorbing ammonia and carbon dioxide in the absorber 140 may be concentrated by a concentrator 130 and then recirculated to the osmotic solution zone 100b of the forward osmosis unit 100. The concentrator 130 may be located between the absorber 140 and the ammonia condenser 120 so that the circulated solution comes into contact with the second gas mixture supplied from the ammonia condenser 120. In addition, a gas that is not absorbed by the absorber 140 and is discharged may be treated with washing water and then discharged from a washing unit.

Hereinafter, exemplary examples will be described to aid in understanding of the present disclosure, but these examples are provided only to more easily understand the present disclosure and are not intended to limit the scope of the present disclosure.

EXAMPLES

Example 1

According to the aspect illustrated in FIG. 2, to produce 100 ton/hr of water through a flow 6, an ammonium bicarbonate solution 10a supplied to the forward osmosis unit 100 includes 10 wt % of ammonium bicarbonate and has a flow rate of 100 ton/hr. The amount of water moving by osmotic pressure from the treated water zone 100a to the osmotic solution zone 100b of the forward osmosis unit 100 via the osmosis membrane 100c is 100 ton/hr, and a total amount of the diluted ammonium bicarbonate solution discharged via a flow 3 in the osmotic solution zone 100b is 200 ton/hr. Atop end portion of a regeneration apparatus including the distillation unit 110, the ammonia condenser 120, and the absorber 140 operates at 1 kgf/cm$^2$ (absolute pressure), i.e., atmospheric pressure, and a pressure of water discharged to a lower portion of the distillation unit 110 via a flow 5 is 1.042 kgf/cm$^2$ (absolute pressure) due to a pressure loss in a tower, and the temperature thereof at this pressure is 101.2° C., which is a boiling temperature of water. The amount of the diluted ammonium bicarbonate solution supplied to the distillation unit 110 to produce 100 ton/hr of water therein is 116 ton/hr, which corresponds to about 58 wt % with respect to the total amount of the diluted ammonium bicarbonate solution. The temperature of the diluted ammonium bicarbonate solution discharged from the forward osmosis unit 100 via the flow 3 is 30° C., and to maximize energy efficiency, the solution is heated at about 65° C. by heat exchange with water discharged via the flow 5 in a heat exchanger 160 and then supplied to the distillation unit 110. In a case in which energy supplied to the heater 170 is steam in accordance with the above conditions, the temperature of steam is about 110° C., and the amount of steam used to produce 100 ton/hr of water is about 17.5 ton/hr. That is, the amount of steam used to produce 1 ton of water is 0.175 ton.

The temperature of steam discharged to an upper portion of the distillation unit 110 is about 93° C., and a weight ratio of carbon dioxide and ammonia in the steam is the same as the weight ratio of carbon dioxide and ammonia in ammonium bicarbonate since ammonium bicarbonate dissolved in water discharged to the lower portion of the distillation unit 110 is completely removed and discharged, and the weight ratio is about 2.59:1.

When 33.5 ton/hr of the diluted ammonium bicarbonate solution including 5 wt % of ammonium bicarbonate discharged from the forward osmosis unit 100 via the flow 3a' is introduced into an upper portion of the ammonia condenser 120, the second gas mixture discharged to the upper portion of the ammonia condenser 120 is cooled at about 87° C., the weight ratio of carbon dioxide and ammonia in the second gas mixture discharged to the upper portion of the ammonia condenser 120 is increased to 4.2:1, and the weight ratio of carbon dioxide and ammonia in the first mixed solution discharged to a lower portion of the ammonia condenser 120 is decreased to 0.5:1. Thus, when this solution is introduced into an upper portion of the absorber 140, the amount of carbon dioxide that can be absorbed by ammonia is increased.

The absorber 140 receives the solution discharged to the lower portion of the ammonia condenser 120 and the remaining diluted ammonium bicarbonate solution (i.e., an amount obtained by subtracting the amount supplied to the distillation unit 110 and the ammonia condenser 120 from the total amount of the diluted ammonium bicarbonate solution) via a flow 8 and the flow 3a and collects carbon dioxide and ammonia.

Thus, the amount of carbon dioxide discharged to an upper portion of a regeneration tower and lost is about 875 kg/hr.

Comparative Example 1A

Unlike Example 1, when operated at atmospheric pressure without an ammonia condenser, 1,800 kg/hr of carbon dioxide, which corresponds to twice that of Example 1, is lost.

Comparative Example 1B

Unlike Example 1, in a case in which atmospheric pressure operation is performed without an ammonia condenser and a solution is discharged from a zone having a relatively high ammonia concentration at a side surface of a distillation unit and introduced into an absorber to reduce the loss of carbon dioxide, energy is lost by the solution discharged into the side surface of the distillation unit, and thus the amount of steam used to produce 1 ton of water is about 0.2 ton or more, which corresponds to 1.1 times or more that of Example 1.

Example 2

According to the aspect illustrated in FIG. 4, to produce 100 ton/hr of water via a flow 6, the ammonium bicarbonate solution 10a supplied to the forward osmosis unit 100 includes 10 wt % of ammonium bicarbonate and has a flow rate of 100 ton/hr. The amount of water moving by osmotic pressure from the treated water zone 100a to the osmotic solution zone 100b of the forward osmosis unit 100 via the osmosis membrane 100c is 100 ton/hr, and a total amount of the diluted ammonium bicarbonate solution discharged from the osmotic solution zone 100b via the flow 3 is 200 ton/hr. A top end portion of a regeneration apparatus including the distillation unit 110, the ammonia condenser 120, and the absorber 140 operates at 0.4 kgf/cm$^2$ (absolute pressure), a pressure of water discharged to a lower portion of the distillation unit 110 via the flow 5 is 0.41 kgf/cm$^2$ (absolute pressure) due to a pressure loss in a tower, and the temperature thereof at this pressure is about 78° C., which is a boiling temperature of water. The amount of the diluted ammonium bicarbonate solution supplied to the distillation unit 110 to produce 100 ton/hr of water therein is 113 ton/hr, which corresponds to about 56.5 wt % with respect to the total amount of the diluted ammonium bicarbonate solution. The temperature of the diluted ammonium bicarbonate solution discharged from the forward osmosis unit 100 via the flow 3 is 30° C., and to maximize energy efficiency, the solution is heated at about 52° C. by heat exchange with water discharged via the flow 5 in the heat exchanger 160 and then supplied to the distillation unit 110. In a case in which energy supplied to the heater 170 is steam in accordance with the above conditions, the temperature of steam is about 90° C., and the amount of steam used to produce 100 ton/hr of water is about 12 ton/hr. That is, the amount of steam used to produce 1 ton of water is 0.12 ton.

The temperature of steam discharged to an upper portion of the distillation unit 110 is about 70° C., and a weight ratio of carbon dioxide and ammonia in the steam is the same as the weight ratio of carbon dioxide and ammonia in ammonium bicarbonate since ammonium bicarbonate dissolved in water discharged to the lower portion of the distillation unit 110 is completely removed and discharged, and the weight ratio is about 2.59:1.

A decompression device 210 configured to maintain reduced pressure is located at an upper portion of the distillation unit 110, and steam discharged to the upper portion of the distillation unit 110 is suctioned at a pressure of 0.41 kgf/cm$^2$ (absolute pressure) using the decompression device 210 and compressed at atmospheric pressure. The temperature of the steam discharged from the decompression device 210 is raised to about 150° C. by compression energy when the decompression device 210 does not include a separate cooling device.

When 13 ton/hr of the diluted ammonium bicarbonate solution including 5 wt % of ammonium bicarbonate discharged from the forward osmosis unit 100 via the flow 3a' is introduced into an upper portion of the ammonia condenser 120, the second gas mixture discharged to the upper portion of the ammonia condenser 120 is cooled at about 90° C., the weight ratio of carbon dioxide and ammonia in the second gas mixture discharged to the upper portion of the ammonia condenser 120 is increased to 3.3:1, and the weight ratio of carbon dioxide and ammonia in the first mixed solution discharged to a lower portion of the ammonia condenser 120 is decreased to 0.4:1. Thus, when this solution is introduced into an upper portion of the absorber 140, the amount of carbon dioxide that can be absorbed by ammonia is increased.

The absorber 140 receives the solution discharged to the lower portion of the ammonia condenser 120 and the remaining diluted ammonium bicarbonate solution (i.e., an amount obtained by subtracting the amount supplied to the distillation unit 110 and the ammonia condenser 120 from the total amount of the diluted ammonium bicarbonate solution) via the flow 8 and the flow 3a and collects carbon dioxide and ammonia.

Thus, the amount of carbon dioxide discharged to an upper portion of a regeneration tower and lost is about 875 kg/hr.

Comparative Example 2A

Unlike Example 2, when the entire regeneration tower operates under reduced pressure to use low-temperature steam without an ammonia condenser, the amount and temperature of used steam are the same as those of Example 2, but 2,160 kg/hr of carbon dioxide, which corresponds to 2.47 times that of Example 2, is lost.

Comparative Example 2B

Unlike Example 2, in a case in which reduced pressure operation is performed without an ammonia condenser and a solution is discharged from a zone having a relatively high ammonia concentration at a side surface of a distillation unit and introduced into an absorber to reduce the loss of carbon dioxide, energy is lost by the solution discharged into the side surface of the distillation unit, and thus the amount of steam used to produce 1 ton of water is about 0.14 ton or more, which corresponds to 1.1 times or more that of Example 1.

All simple changes and modifications of the present disclosure are within the scope of the present disclosure, and the scope of the present disclosure should be defined by the appended claims.

DESCRIPTION OF REFERENCE NUMERALS

1: flow of waste water, contaminated water, or seawater
2: flow of treated water
3: flows of diluted ammonium bicarbonate solution (flows 3a, 3a', and 3b are branched from a flow 3)
4: flow of heated ammonium bicarbonate solution
5: flow of water separated from distillation unit
6: flow of cooled water
7: flow of first mixed solution
8: flow of cooled first mixed solution
9: flow of concentrated ammonium bicarbonate solution
10: flows of cooled ammonium bicarbonate solution (flows 10a and 10b are branched from a flow 10)
11: flow of exhaust gas
12: flow of washing water
13: a discharge flow of washing water
100: forward osmosis unit (100a: treated water zone, 100b: osmotic solution zone, 100c: osmosis membrane)
110: distillation unit
120: ammonia condenser
130: concentrator
140: absorber
150: washing unit
160: heat exchanger
170: heater (reboiler)
180, 190, 200: cooler
210: decompression device

What is claimed is:

1. A method of regenerating an ammonium bicarbonate solution, the method comprising (A) supplying an ammonium bicarbonate solution diluted by forward osmosis to a distillation unit, an top portion of an ammonia condenser, and an top portion of an absorber; (B) distilling the diluted ammonium bicarbonate solution supplied to the distillation unit to discharge a first gas mixture including carbon dioxide and ammonia, and supplying the discharged first gas mixture to a bottom portion of the ammonium condenser; (C) bringing the first gas mixture supplied to the bottom portion of the ammonium condenser in process (B) into contact with the diluted ammonium bicarbonate solution supplied to the top portion of the ammonium condenser in process (A) to be separated into a first mixed solution and a second gas mixture, supplying the first mixed solution to the top portion of the absorber, and supplying the second gas mixture to a bottom portion of the absorber; and (D) bringing the second gas mixture supplied to the bottom portion of the absorber in process (C) into contact with the diluted ammonium bicarbonate solution supplied to the top portion of the absorber in process (A) and the first mixed solution supplied to the top portion of the absorber in process (C) to recover a concentrated ammonium bicarbonate solution.

2. The method of claim 1, wherein the first mixed solution comprises a larger amount of ammonia than carbon dioxide and the second gas mixture comprises a larger amount of carbon dioxide than ammonia, on a molar basis.

3. The method of claim 2, wherein an amount of ammonia in the first mixed solution ranges from 100 wt % to 400 wt % with respect to an amount of carbon dioxide included in the first mixed solution, and an amount of ammonia in the second gas mixture ranges from 5 wt % to 35 wt % with respect to an amount of carbon dioxide included in the second gas mixture.

4. The method of claim 1, wherein a temperature of the top portion of the ammonia condenser ranges from 60° C. to 97° C.

5. The method of claim 1, wherein the distillation unit operates at atmospheric pressure or sub-atmospheric pressure.

6. The method of claim 5, wherein, when the distillation unit operates at atmospheric pressure, the ammonia condenser comprises a cooler.

7. The method of claim 6, wherein the distillation unit, the ammonia condenser, and the absorber are located in a single apparatus.

8. The method of claim 5, wherein, when the distillation unit operates under sub-atmospheric pressure, the first gas mixture generated from the distillation unit is pressurized at atmospheric pressure and supplied to the ammonia condenser.

9. The method of claim 8, wherein the distillation unit is located in an apparatus separated from the ammonia condenser and the absorber.

10. The method of claim 5, wherein an amount of the diluted ammonium bicarbonate solution supplied to the ammonia condenser ranges from 2 wt % to 40 wt % with respect to a total amount of the diluted ammonium bicarbonate solution.

11. The method of claim 1, further comprising (E) washing an exhaust gas with washing water, the exhaust gas not being recovered into the concentrated ammonium bicarbonate solution in the absorber, and discharging the exhaust gas.

12. The method of claim 1, wherein an amount of the diluted ammonium bicarbonate solution supplied to the distillation unit ranges from 30 wt % to 75 wt % with respect to a total amount of the diluted ammonium bicarbonate solution.

* * * * *